(12) United States Patent
Marais

(10) Patent No.: US 12,722,611 B2
(45) Date of Patent: Sep. 1, 2026

(54) METHOD AND DEVICE FOR OPERATING A BRAKING SYSTEM OF A MOTOR VEHICLE

(71) Applicant: Bayerische Motoren Werke Aktiengesellschaft, Munich (DE)

(72) Inventor: Yoann Marais, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 19/127,165

(22) PCT Filed: Sep. 15, 2023

(86) PCT No.: PCT/EP2023/075440
§ 371 (c)(1),
(2) Date: May 5, 2025

(87) PCT Pub. No.: WO2024/099619
PCT Pub. Date: May 16, 2024

(65) Prior Publication Data

US 2026/0167164 A1 Jun. 18, 2026

(30) Foreign Application Priority Data

Nov. 10, 2022 (DE) ..................... 10 2022 129 752.7

(51) Int. Cl.
*B60T 8/88* (2006.01)
*B60R 21/0134* (2006.01)
(Continued)

(52) U.S. Cl.
CPC .......... *B60T 8/885* (2013.01); *B60R 21/0134* (2013.01); *B60R 21/0136* (2013.01);
(Continued)

(58) Field of Classification Search
CPC .......... B60T 8/885; B60T 7/122; B60T 8/172; B60T 8/1755; B60R 21/0134; B60R 21/0136; B60W 30/09; B60W 30/143
See application file for complete search history.

(56) References Cited

U.S. PATENT DOCUMENTS

2016/0167633 A1 6/2016 Lau et al.
2017/0057498 A1* 3/2017 Katoh .................. B60W 30/09
(Continued)

FOREIGN PATENT DOCUMENTS

DE 10 2004 058 814 A1 6/2006
DE 10 2006 055 008 A1 5/2008
(Continued)

OTHER PUBLICATIONS

International Search Report (PCT/ISA/210) issued in PCT Application No. PCT/EP2023/075440 dated Nov. 24, 2023 with English translation (5 pages).
(Continued)

*Primary Examiner* — Jacob M Amick
(74) *Attorney, Agent, or Firm* — Crowell & Moring LLP

(57) ABSTRACT

A method for operating a brake system of a motor vehicle comprising a first electronic control device and a second electronic control device, wherein the first control device actuates the brake system, and wherein the second control device controls at least one driving stabilization function/ driving stability program. A collision of the motor vehicle is first identified. Then, at least one physical value, which is allocated to the identified collision and is dependent thereon, is recorded and compared with a predefined limit value. Based on this, a braking operation is initiated by way of the first electronic control device and/or the second electronic control device. A device for carrying out the method is also disclosed.

10 Claims, 3 Drawing Sheets

(51) Int. Cl.

| | |
|---|---|
| ***B60R 21/0136*** | (2006.01) |
| ***B60T 7/12*** | (2006.01) |
| ***B60T 8/172*** | (2006.01) |
| ***B60T 8/1755*** | (2006.01) |
| ***B60W 30/09*** | (2012.01) |
| ***B60W 30/14*** | (2006.01) |

(52) U.S. Cl.

CPC .............. *B60T 7/122* (2013.01); *B60T 8/172* (2013.01); *B60T 8/1755* (2013.01); *B60W 30/09* (2013.01); *B60W 30/143* (2013.01)

(56) References Cited

U.S. PATENT DOCUMENTS

| | | | | |
|---|---|---|---|---|
| 2018/0297545 | A1* | 10/2018 | Yamaguchi | G07C 5/085 |
| 2021/0221364 | A1* | 7/2021 | Mase | B60W 30/18163 |
| 2022/0153304 | A1* | 5/2022 | Kanzler | B60R 21/0134 |

FOREIGN PATENT DOCUMENTS

| | | | |
|---|---|---|---|
| DE | 10 2006 059 036 | A1 | 6/2008 |
| DE | 10 2014 226 109 | A1 | 6/2016 |

OTHER PUBLICATIONS

German-language Written Opinion (PCT/ISA/237) issued in PCT Application No. PCT/EP2023/075440 dated Nov. 24, 2023 with English translation (8 pages).

German language Search Report issued in German Application No. 10 2022 129 752.7 dated Jul. 27, 2023 with partial English translation (10 pages).

* cited by examiner 10
30
32
12
28
20
14
34
36
20
16
18
22
28
32
24
26

METHOD AND DEVICE FOR OPERATING A BRAKING SYSTEM OF A MOTOR VEHICLE

BACKGROUND AND SUMMARY

This disclosure relates to a method and device for operating a braking system of a motor vehicle.

Motor vehicles typically have a central controller for controlling all the driving functions. This includes controlling the propulsion and also the assistance function and driving stabilization function.

Furthermore, for reasons of robustness and availability, it is standard practice to provide in addition a braking control unit, which can be used to actuate a braking system.

In normal operation, i.e. in standard driving situations that do not constitute an extreme case, the braking control unit receives a brake command in the form of a signal, and forwards this to the driving-function control unit. If applicable, this adapts the brake command suitably, taking into account the driving stabilization function. The control unit relies on a plurality of sensors for this purpose, for instance in order to detect the existing steering angle, the transverse acceleration, the yaw rate, the yaw acceleration and the wheel speed, and to adapt the brake command suitably on the basis of these values. Then the, possibly altered, brake command is transferred back to the braking control unit. This controls the braking system, and thereby initiates a braking process.

If an impact occurs to the motor vehicle, then the motor vehicle is decelerated automatically by way of the braking control unit. This is necessary in order to prevent further impacts, for instance because the vehicle is no longer maneuverable, the driver is unconscious or in shock, or the steering wheel cannot be operated because of a released airbag. "Impact" shall be understood in the general sense to mean an accident, and can therefore involve, for example, a front, rear or side impact or a vehicle roll, or any other unintentional contact of the vehicle with an object that could cause damage to the motor vehicle. Thus in the event of an impact, there may no longer be any brake command given by the driver, and instead this is given by the braking control unit, which forwards it to the driving-function control unit, as described in the paragraphs above.

If, however, as a result of the impact, communication between the control units is impaired or there are no (reliable) values for the driving-function control unit in order to guarantee a driving stabilization function for the vehicle, for instance because sensors are damaged or the front axle is so badly affected by the accident that the steering angle cannot be determined, then the braking control unit only recognizes this after a certain time, and control is switched solely to the braking control unit.

Alternatively, the braking control unit could forward the brake command directly as a braking request to the braking system, without first forwarding this to the driving-function control unit. This would have the consequence, however, that any automatic braking after an accident would take place without taking account of the driving stabilization function, which could have a detrimental effect on the braking.

Proceeding from this, an object of the disclosure is to provide a method for operating a braking system of a motor vehicle that ensures after an impact to a motor vehicle, improved deceleration of the motor vehicle.

This object is achieved according to the disclosure by a method for operating a braking system of a motor vehicle having a first electronic control unit and a second electronic control unit, wherein the first control unit is designed to control the braking system, and wherein the second control unit is designed to control at least one driving stabilization function, having the following steps:

a) recognizing an impact to the motor vehicle;

b) detecting at least one physical value, which is associated with, and depends on, the recognized impact;

c) comparing the detected physical value with a specified limit value; and d) initiating a braking process by way of the first electronic control unit, and controlling at least one driving stabilization function by way of the second electronic control unit, if the detected physical value is less than the limit value, or initiating a braking process by way of the first electronic control unit and not controlling at least one driving stabilization function by way of the second electronic control unit, if the detected physical value reaches or exceeds the limit value.

Thus, an object of the disclosure is to ascertain on the basis of the physical value determined in step b) whether the impact is a "minor" or "serious" accident to the motor vehicle. This is done by comparing in step c) the physical value with a limit value.

If the physical value, or the magnitude thereof, lies below the specified limit value, then it can be assumed that the impact is a "minor" accident. It can be inferred therefrom that a stable connection between the first and second control units exists even after the impact, and all the measurement values needed to realize the driving stabilization function are available to the second control unit. It can also be assumed therefrom that the vehicle, in particular the chassis, is still intact, and therefore the vehicle remains maneuverable.

Accordingly, in step d), the braking process is initiated by way of the first electronic control unit, and the driving stabilization function is performed by the second electronic control unit.

If, however, the physical value, or the magnitude thereof, reaches the specified limit value, or lies above this value, then this is classified as a "serious" accident. It can be inferred therefrom that the connection between the first and second control units might be lost or impaired. In addition, the sensors for realizing the driving stabilization function may also be damaged, and therefore no values, or only implausible values, are available to the second electronic control unit, for instance because the front axle steering is damaged and implausible steering angles exist. It can also be assumed therefrom that the vehicle is maneuverable only to a limited extent, and, for example, the chassis is damaged.

In this case, the braking process is initiated by way of the first electronic control unit. Control of a driving stabilization function by the second electronic control unit does not take place, however, and therefore no time is lost in which the first control unit tries to contact the second control unit, which is no longer connected or not in working order.

The at least one physical value can be a mean and/or maximum acceleration during the impact and/or a value that depends on the impact impulse produced in the accident.

Both the acceleration and the impact impulse can be used to draw clear conclusions about the "strength" of an impact. Furthermore, motor vehicles are typically provided anyway with sensors that detect these values during an impact, for instance in order to ascertain whether or not it is necessary to release airbags.

In addition, the physical value can also be a pressure, which is measured in a tube running along the bodywork of the vehicle. If an impact occurs to the vehicle, the tube is deformed according to the impact, and inside the tube a pressure arises that can be measured and likewise used to assess the "strength" of the impact. Such a tube is typically located in the fender of the vehicle.

The specified limit value can preferably be defined such that if, in step c), the limit value is not reached, the airbags of the vehicle are not released, and if the limit value is reached or exceeded, at least one airbag is released.

The driver can thereby continue to steer the motor vehicle after a "minor" accident and with no airbag released. If it is a "serious" accident in which the vehicle is anyway no longer maneuverable, then additionally at least one airbag is released. It is then immaterial anyway that the driver may no longer be able to operate the steering wheel because of the released airbag.

In addition, the limit value can be defined such that if, in step c), the limit value is not reached, the second electronic control unit can control the driving stabilization function on the basis of a steering angle present in steps c) and d) and/or a wheel speed and/or a transverse acceleration and/or a yaw rate and/or a yaw moment.

Consequently, the limit value is selected such that the driving stabilization function can continue to take place on the basis of these values, because the corresponding sensors are still able to work and are at least almost in full working order despite the "minor" accident. Hence this ensures continued realization of the driving stabilization function by way of the second electronic control unit.

The braking process initiated in step d) is preferably performed until the motor vehicle is at a standstill. This can prevent the driver, who is in shock, from continuing to move the motor vehicle after an accident, or prevent secondary accidents from happening, for instance because the driver is unconscious and can no longer actively steer the vehicle, or the vehicle is no longer maneuverable.

In addition, the braking process initiated in step d) is performed immediately after the impact to the motor vehicle recognized in step a).

According to a variant, if, in step c), the limit value is exceeded, a driving stabilization function can be controlled in step d) by way of the first electronic control unit. Thus this ensures that even if the limit value is exceeded, the initiated braking process performed in step d) takes account of stabilization of the driving behavior.

In this case, the driving stabilization function of the first electronic control unit can be reduced in scope compared with the driving stabilization function of the second control unit, and can rely solely on a wheel speed of the motor vehicle for the purposes of control. The first electronic control unit accordingly models a driving stabilization function that is far simpler and more straightforward than that of the second control unit. This has the advantage that on initiating the braking process, the motor vehicle can still be suitably stabilized, and this driving stabilization function has to rely solely on a wheel speed or the wheel speed of a plurality of wheels of the motor vehicle, without having to rely on further measured values.

It is also conceivable here that the vehicle is stabilized solely on the basis of available and plausible wheel speeds. If, for example, the motor vehicle has experienced a front impact that has severely damaged the front axle, then the driving stabilization function can still rely on the wheel speeds of the rear wheels to stabilize the motor vehicle.

The object mentioned in the introduction is also addressed by a device for carrying out the method according to the disclosure, having a braking system, a sensor apparatus for detecting a steering angle and/or a wheel speed and/or a transverse acceleration and/or a yaw rate and/or a yaw moment, an impact sensor apparatus for detecting an impact to the motor vehicle and having sensors for detecting at least one physical value, which exists in the event of a detected impact and depends thereon, a first electronic control unit, which is configured to query continuously whether an impact exists and, if a limit value is not reached, to control the braking system directly or indirectly on the basis of at least one physical value via a second electronic control unit for achieving vehicle stabilization, which is configured to control at least one driving stabilization function during a braking process.

With regard to the resulting advantages, reference is made to the explanations above.

The impact sensor apparatus for detecting an impact to the motor vehicle can have acceleration impact sensors and/or sensors for detecting a value that depends on the impact impulse produced during the accident. The sensors may be pressure sensors for detecting a pressure in a tube running along the bodywork of the motor vehicle. As stated in the explanation above, this runs in particular along the vehicle fender.

With regard to further advantages resulting therefrom, reference is made to the explanations above.

BRIEF DESCRIPTION OF THE DRAWINGS

The disclosure is described using an exemplary embodiment, which is represented in the accompanying drawings.

DETAILED DESCRIPTION OF THE DRAWINGS

Figure 1:
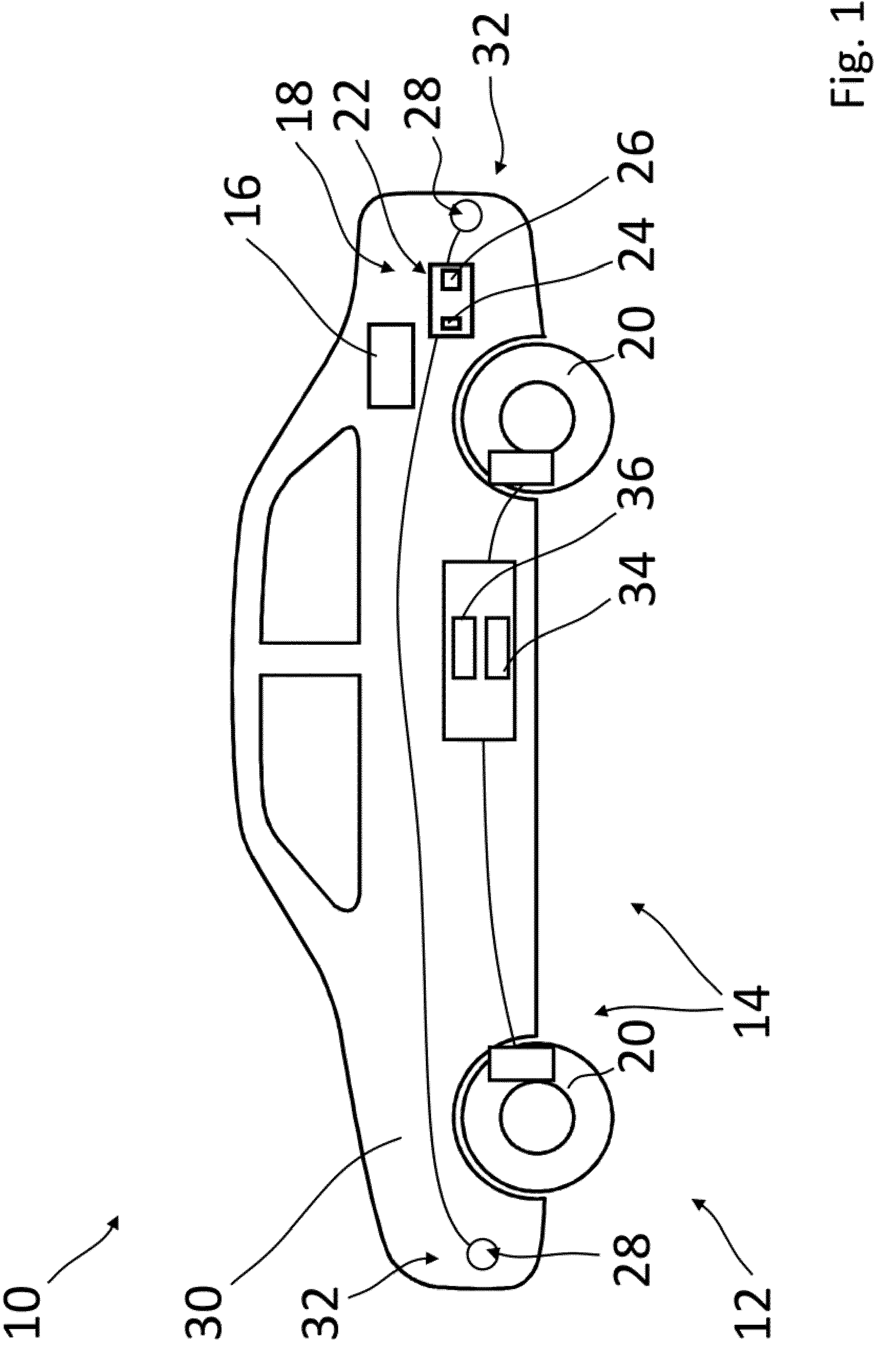
FIG. 1 shows schematically a motor vehicle having a device according to the disclosure.

FIG. 1 shows a motor vehicle 10 having a device 12, which comprises a braking system 14, a sensor apparatus 16, and an impact sensor apparatus 18.

The sensor apparatus 16 is used to detect a steering angle and/or a wheel speed and/or a transverse acceleration and/or a straight line and/or a yaw moment, which act on the motor vehicle 10.

The impact sensor apparatus 18 is used to detect an impact to the motor vehicle 10. "Impact" shall be understood in the general sense to mean an accident, and can therefore involve, for example, a front, rear or side impact, or any other unintentional contact of the vehicle with an object that could cause damage to the motor vehicle.

The impact sensor apparatus 18 has sensors 22 for this purpose, which are used to sense at least one physical value, which exists in the event of a detected impact and depends on the impact. The sensors 22 are acceleration impact sensors 24 and/or sensors 26 which detect a value that depends on the impact impulse. For example, these sensors 26 are in the form of pressure sensors and are assigned to a tube 28 which extends along bodywork 30, one in each of the fenders 32 of the motor vehicle.

In addition, the device 12 comprises a first electronic control unit 34 and a second electronic control unit 36.

The first control unit 34 is in the form of a braking control unit, whereas the second electronic control unit 36 is embodied as a driving-function control unit and can perform, inter alia, at least one driving stabilization function during a braking process. The first control unit 34 and/or the second electronic control unit 36 may comprise, or be embodied in, one or more controllers or processors, which may be configured to execute software, algorithms, logic, and/or instructions saved on a memory.

Figure 2:
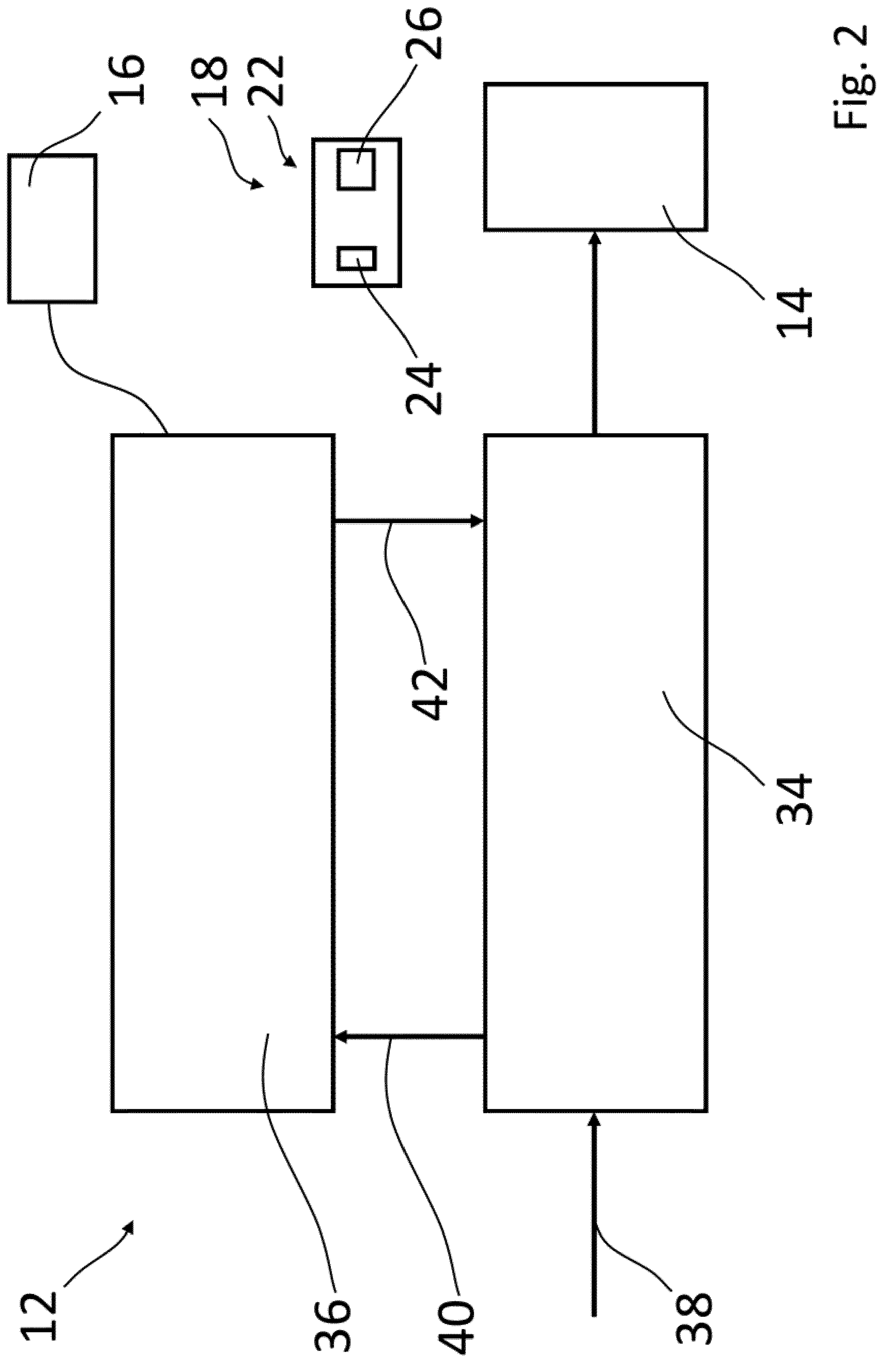
FIG. 2 shows in detail the device according to the disclosure from FIG. 1 in a first operating mode; and, FIG. 3 shows the device according to the disclosure from FIG. 2 in a second operating mode.
Figure 3:
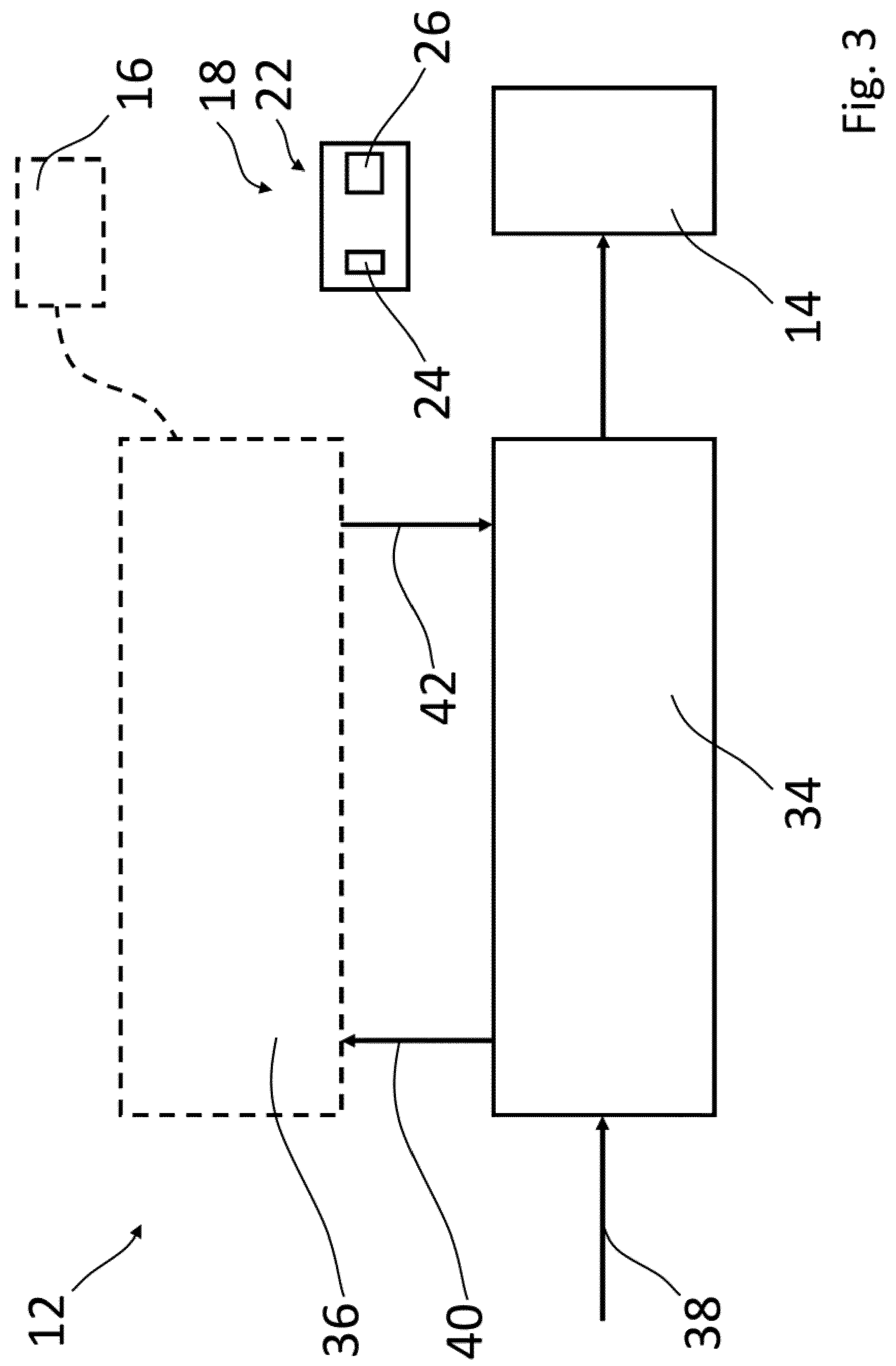

The operation of the braking system 14 of the motor vehicle 10 shall be explained below with reference to FIGS. 2 and 3. Normal operation in usual traffic situations is discussed first, and then the operation of the braking system 14 when the motor vehicle 10 experiences an impact, i.e. an accident.

If a braking process is initiated in normal operation, then the first electronic control unit 34 receives a brake command at the signal input 38. This brake command is forwarded via a signal line 40 to the second electronic control unit 36. The second electronic control unit then performs, if applicable, at least one driving stabilization function, and, if applicable, adapts the brake command such that the vehicle continues to have a stable driving behavior during the braking process. The second electronic control unit 36 relies here on the measurement values from the sensor apparatus 16.

The, possibly modified, brake command is now fed back by the second control unit 36 via the signal line 42 to the first electronic control unit 34. This in turn actuates the braking system 14, with the result that a braking process based on the given brake command is initiated.

If the motor vehicle 10 experiences an impact, this is recognized by sensors. This is done by way of the impact sensor apparatus 18, which can ascertain by way of the sensors 22, 24, 26 whether an impact exists.

The first electronic control unit 34 is configured such that it queries continuously whether an impact exists. Alternatively, it can also be actively reported via the signal input 38, for example by the impact sensor apparatus 18, that an impact has been recognized.

In addition, at least one physical value is detected, which is associated with, and depends on, the recognized impact. This is also detected by the impact sensor apparatus 18.

The physical value is, for example, the mean and/or maximum acceleration during the impact that is acquired by way of the acceleration impact sensors 24.

Alternatively or additionally, the at least one physical value can also be a value that depends on the impact impulse caused by the impact to the motor vehicle 10. For example, this is a pressure in the tube 28, which is detected by way of the sensors 26 implemented as pressure sensors.

This at least one physical value is then compared with a specified braking value.

The comparison can be made either by the first electronic control unit 34 or already in advance, and therefore the first electronic control unit 34 merely receives via the signal line 38 the information whether the physical value is less than the specified limit value or whether it reaches, or even has exceeded, the limit value.

The physical value thus gives a reference point for the "strength" of the impact to the motor vehicle 10. The limit value represents a threshold for classifying on the basis of the physical value an impact taking place on the motor vehicle. Since the physical value depends on the impact, the "strength" of the impact influences this directly. The comparison of the physical value with the specified limit value then classifies the impact as a "minor" impact if the physical limit value, or the magnitude thereof, lies below the specified limit value, and as a "severe" impact if it reaches or even exceeds the limit value. It is conceivable here that the specified limit value is selected such that if the physical value is less than the limit value, the airbags of the vehicle are not released, and therefore in the event of a "minor impact" the driver continues to have access to the steering wheel and can maneuver the vehicle, whereas if the limit value is reached and exceeded, at least one airbag is released.

The further operation for the case in which the physical value is less than the limit value shall be explained below first with reference to FIG. 2.

In this case, in the next step, a braking process is initiated automatically by way of the first electronic control unit 34, and, similar to in normal operation, this forwards the brake command via the signal line 40 to the second electronic control unit 36, which controls at least one driving stabilization function on the basis of the measurement values detected by the sensor apparatus 16. The driving stabilization function is based at least on the steering angle and/or the wheel speed and/or the transverse acceleration and/or the yaw rate and/or the yaw moment, which exist during or after the impact.

Then this, possibly adapted, brake command is in turn transferred back to the first control unit 34 via the signal line 42, and the first electronic control unit 34 actuates the braking system 14 to initiate an automatic braking process after the impact.

The braking process initiated here is performed until the motor vehicle is at a standstill. This prevents the vehicle from moving in an uncontrolled manner after the impact and possibly other unintentional impacts taking place.

The further operation of the braking system 14 when the physical value is greater than or equal to the specified limit value shall now be explained below with reference to FIG. 3.

As already explained in the previous paragraphs, a "serious impact" can be assumed in such a case. Consequently, there is no guarantee that the first electronic control unit 34 can still communicate with the second electronic control unit 36 via the signal lines 40, 42. Regardless thereof, there is also the possibility that the sensor apparatus 16 is damaged, is supplying implausible measurement values or else is supplying measurement values that cannot be used to realize a driving stabilization function. The latter is the case, for example, if the front axle of the vehicle 10 is damaged and huge steering angles are ascertained that also differ sharply between wheels, with the result that a reliable driving stabilization function can no longer be realized.

Therefore, if the physical value reaches or exceeds the limit value, the initiation of the automatic braking process is made solely by way of the first electronic control unit 34 without a driving stabilization function taking place by way of the second electronic control unit 36. It can hence be ensured that when a "severe" impact exists, the vehicle 10 is still decelerated reliably without the first electronic control unit 34 trying to contact the second electronic control unit 36.

For the further steps it also applies, as previously described, that the braking process takes place until the motor vehicle 10 is at a standstill, and that the braking process can be initiated with a time delay.

It is also conceivable that the first electronic control unit 34 itself realizes a driving stabilization function. This function can be reduced in scope compared with the previously described driving stabilization function of the second control unit 36, and can rely solely on a wheel speed of the motor vehicle 10 for the purpose of control. This is particularly suitable when plausible wheel speeds are still being measured at a vehicle axle of the vehicle 10, which is the case, for instance, if a vehicle is damaged only at the vehicle front or at the vehicle rear.

The invention claimed is:

1. A method for operating a braking system of a motor vehicle having a first electronic control unit and a second electronic control unit, wherein the first control unit controls the braking system, and wherein the second control unit controls at least one driving stabilization function, the method comprising:

recognizing an impact to the motor vehicle;

detecting at least one physical value, which is associated with, and depends on, the recognized impact;

comparing the detected physical value with a specified limit value; and initiating a braking process by way of the first electronic control unit, and controlling at least one driving stabilization function by way of the second electronic control unit, if the detected physical value is less than the limit value, or initiating a braking process by way of the first electronic control unit and not controlling at least one driving stabilization function by way of the second electronic control unit, if the detected physical value reaches or exceeds the limit value.

2. The method according to claim 1, wherein the at least one physical value is a mean and/or maximum acceleration during the impact and/or a value that depends on the impact impulse produced in the accident.

3. The method according to claim 1, wherein the physical value is a pressure, which is measured in a tube running along the bodywork of the vehicle.

4. The method according to claim 1, wherein the specified limit value is preferably defined such that if the limit value is not reached, the airbags of the vehicle are not released, and if the limit value is reached or exceeded, at least one airbag is released.

5. The method according to claim 1, wherein the limit value is defined such that if the limit value is not reached, the second electronic control unit controls the driving stabilization function on the basis of a steering angle and/or a wheel speed and/or a transverse acceleration and/or a yaw rate and/or a yaw moment.

6. The method according to claim 1, wherein the braking process is performed until the motor vehicle is at a standstill.

7. The method according claim 1, wherein if the limit value is exceeded, a driving stabilization function is controlled in by way of the first electronic control unit.

8. The method according to claim 7, wherein the driving stabilization function of the first electronic control unit is reduced in scope compared with the driving stabilization function of the second control unit, and relies solely on a wheel speed of the motor vehicle for the purposes of control.

9. A device for performing the method according to claim 1, comprising:

a braking system, a sensor apparatus for detecting a steering angle and/or a wheel speed and/or a transverse acceleration and/or a yaw rate and/or a yaw moment, an impact sensor apparatus for detecting an impact to the motor vehicle and having sensors for detecting at least one physical value, which exists in the event of a detected impact and depends thereon, a first electronic control unit, which is configured to query continuously whether an impact exists and, if a limit value is not reached, to control the braking system directly or indirectly on the basis of at least one physical value via a second electronic control unit for achieving vehicle stabilization, which is configured to control at least one driving stabilization function during a braking process.

10. The device according to claim 9, wherein the impact sensor apparatus for detecting an impact to the motor vehicle comprises acceleration impact sensors and/or sensors for detecting a value that depends on the impact impulse produced during the accident.

* * * * *